United States Patent
Salomaa et al.

(10) Patent No.: US 6,501,575 B2
(45) Date of Patent: Dec. 31, 2002

(54) ROUTING IN A WDM SYSTEM

(75) Inventors: Ari Salomaa, Espoo (FI); Olli-Pekka Hiironen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/891,732

(22) Filed: Jun. 26, 2001

(65) Prior Publication Data

US 2002/0018262 A1 Feb. 14, 2002

Related U.S. Application Data

(63) Continuation of application No. PCT/FI99/01071, filed on Dec. 22, 1999.

(30) Foreign Application Priority Data

Dec. 31, 1998 (FI) ................................................. 982844

(51) Int. Cl.[7] ............................................... H04J 14/02
(52) U.S. Cl. ........................ 359/124; 359/128; 359/127
(58) Field of Search ........................ 359/124, 127–128, 359/133

(56) References Cited

U.S. PATENT DOCUMENTS

| | | | |
|---|---|---|---|
| 5,438,444 A | 8/1995 | Tayonaka et al. | ............ 319/123 |
| 5,724,167 A | 3/1998 | Sabella | ................ 319/128 |
| 5,867,289 A | * 2/1999 | Gerstel et al. | ............... 359/128 |
| 6,285,810 B1 | * 9/2001 | Fincato et al. | ................ 385/24 |

FOREIGN PATENT DOCUMENTS

WO    WO 00/41349    7/2000

* cited by examiner

Primary Examiner—Kinfe-Michael Negash
(74) Attorney, Agent, or Firm—Altera Law Group, LLC

(57) ABSTRACT

In the transmitting node of an optical transmission system using wavelength multiplexing and including several channels the information content of each channel is transmitted onto its own wavelength ($\lambda_1$, $\lambda_2$, $\lambda_3$, $\lambda_4$) by modulating the laser transmitter producing the wavelength in question. The obtained optical signals are combined onto the same optical fibre. In the receiving node the sum signal is separated into different wavelengths by using a wavelength-selective optical separation component, whereby a predetermined wavelength and thus a channel is obtained from each output port of the separation component. In accordance with the invention, instead of using optical or electrical cross-connectors for re-routing a certain signal content to another destination, that transmission wavelength on which the signal content is transmitted is in fact changed at the signal transmission end. Since the components of the transmission network are wavelength-selective, no changes need be made in the components, yet they transmit the old wavelength in accordance with the earlier routing plan to the same destination as before, but the signal content transported in the wave has in fact been exchanged for another.

4 Claims, 4 Drawing Sheets

*PRIOR ART*

ROUTING IN A WDM SYSTEM

This is a continuation of PCT/FI99/01071, filed Dec. 22, 1999.

FIELD OF THE INVENTION

The invention relates generally to an optical transmission system using wavelength multiplexing, especially to the routing used therein.

BACKGROUND OF THE INVENTION

Figure 1:
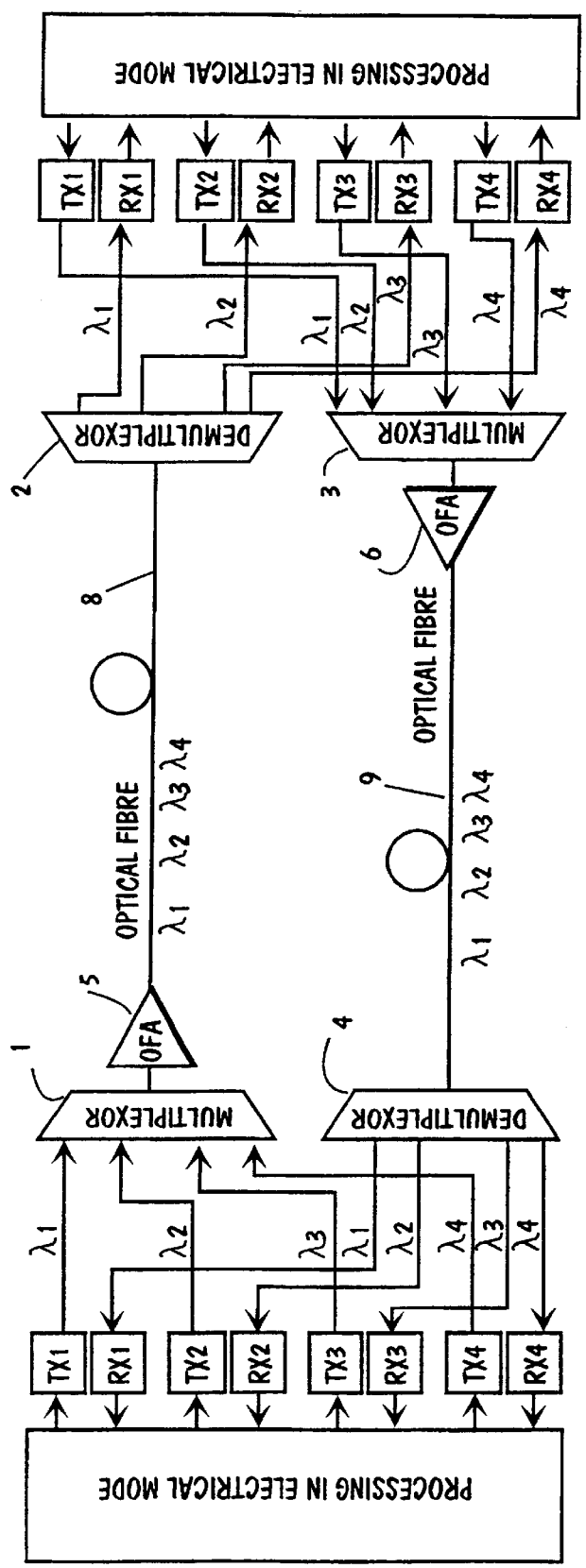

In Wavelength Division Multiplexing WDM, several independent transceiver couples use the same fibre, and each couple uses its own wavelength, which is different from the others FIG. 1 illustrates the principle of wavelength multiplexing. Such a system is used as an example, wherein four channels are used, wherein the wavelengths used are $\lambda_1$, $\lambda_2$, $\lambda_3$ and $\lambda_4$ respectively. The transmission and reception channels use here their own optical fibres. At each end of the optical transmission line there are four transceiver units, of which the transmitter is marked generally as Tx and the receiver as Rx. Transmitter TX1 transmits on wavelength $\lambda_1$ and receiver RX1 receives on the same wavelength, but from a fibre different from the one on which the transmitter transmits. The other couples use their own wavelengths in a corresponding manner.

The wavelengths produced by the transmitters located at the left end of fibre 8 are combined in an optical multiplexer 1 and they are then conducted to the same optical fibre 8. In a similar manner, the wavelengths produced by the transmitters located at the right end of fibre 9 are combined in an optical multiplexer 3 and they are then conducted to the same optical fibre 9.

The WDM demultiplexers 2 and 4 located at opposite ends of the fibres separate the different components of the combined signal from each other. Each one of these signals is expressed by its own receiver RX1, . . . RX4. Each optical channel may include hundreds and even thousands of logical channels.

Thus, a narrow wavelength window in a certain wavelength range is made available to the signal of each source. The International Telecommunication Union ITU-T has standardised the frequencies to be used on the band in such a way that the band begins from a frequency of 191,5 THz (1565,50 nm) and continues in steps of 100 GHz up to a frequency of 195,9 THz (1530,33 nm).

In order to achieve a maximum benefit relating to the optical transmission system, cross-connection functions are needed in the nodes of the network to route signals with different wavelengths to different paths. Components performing such a function are the multiplexerd/demultiplexer, the add/drop multiplexer, the wavelength switch and the wavelength converter. The original purpose of the multiplexer was, just as shown in FIG. 1, to increase the capacity of the existing fibre without adding any new fibres. However, they can work as an add/drop multiplexer, that is, as an access point for the optical layer and as a separation point for the optical layer as well as a part of the cross-connection arrangement.

The optical cross-connect is a small basic part of the optical coupler matrix. Its task is to route the arriving wavelength into one or more physical output ports. The cross-connect may be implemented with a directional coupler. By combining a great number of such 2x2 cross-connects one another by waveguides, it is possible to build a nxn coupler matrix. The cross-connect may also be implemented by using a Semiconductor Optical Amplifier SOA.

The wavelength converter converts the wavelength of the arriving signal into another wavelength, and the converter is needed when such systems are fitted together, wherein different wavelengths are used. Available converters are opto-electronic ones, wherein the incoming optical signal is converted into electrical form, it is regenerated and transmitted further by a transmitter using a fixed wavelength.

Figure 2:
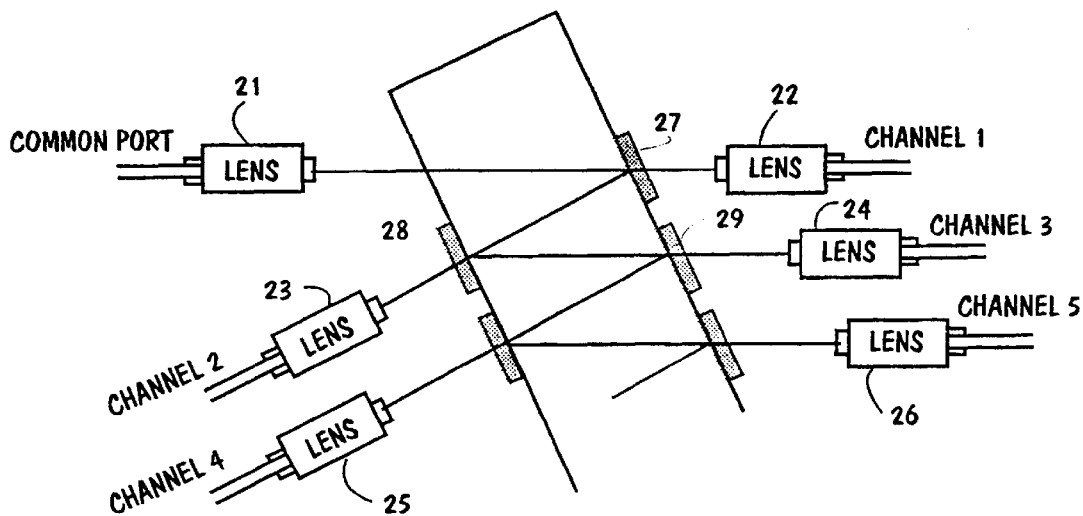

FIG. 2 shows the principal structure of a certain multiplexer/demultiplexer. It contains port-specific lenses and an interference filter marked F. The input fibre is connected to port named "common port", and four wavelength channels )$\lambda_1$, . . . $\lambda_4$ use that fibre in this example. Wavelength $\lambda_1$ (channel 1) goes through lens 21, through interference filter 27 and through lens 22 directly to the output port. The remaining wavelength channels are reflected back from filter 27 and they go forward to filter 28. This filter transmits wavelength $\lambda_2$ which is conducted to lens 23. Thus the channel 2 is separated. In this way, the incoming light signal is reflected back and forth within the multiplexer, and at every reflection point one exactly defined wavelength is admitted through the filter.

In the nodes of the optical network various cross-connections must be performed associated with routing, just like in electric transmission networks. In cross-connection, all wavelengths of the input fibre can be connected to the same output fibre, or certain wavelengths of the input fibre can be connected to certain output fibres. The perfect cross-connection device is an exchange, wherein all connecting functions are optical. At the present time, optical cross-connection devices are still scanty available, so in present systems the signal arriving from the optical link is in fact converted into electrical form. The necessary connections are made in electrical form, and only when the information is transferred to the output link it is converted into optical form.

Figure 3:
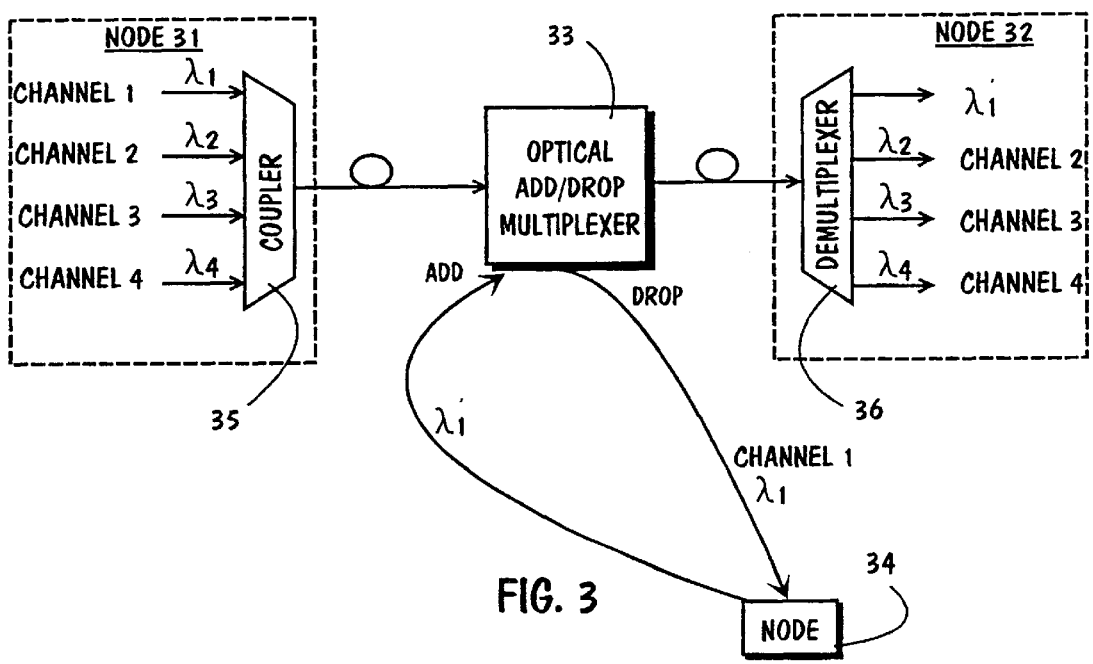

FIG. 3 shows some nodes of an optical transmission network. There the node 31 multiplexes four channels to an optical link by using a coupler 35. It is important to notice that the coupler is not a wavelength-selective component, but each entry of it can be input any wavelength, and the wavelength is then summed with other wavelengths to the same fibre.

The sum signal arrives at an optical add/drop multiplexer 33 located at the middle of the link. It is a device with which one or more of the wavelengths transmitting in the fibre can be separated aside and with which one or more wavelengths can be brought to the fibre. In the arrangement shown in the figure, four optical channels are transmitted to the fibre in transmission node 31: channel 1, wherein the information is transmitted on wavelength $\lambda_1$, channel 2, wherein wavelength $\lambda_2$ is used, channel 3, wherein wavelength $\lambda_3$ is used, and channel 4, wherein the information is transmitted on wavelength $\lambda_4$. Using the add/drop multiplexer 33, channel 1, that is, wavelength $\lambda_1$ is separated and the signal content to be transported on this wavelength is conducted further in fibre 33 towards node 34. The other wavelengths continue further to node 32, wherein the wavelength components are demultiplexed and they are conducted for further processing. Connections to other nodes also start out from the node (not shown).

In the arrangement outlined in the figure, all components except coupler 35 of node 31 are wavelength-sensitive. This means that e.g. in the case of the multiplexer of node 32 an exact predetermined wavelength is obtained from each output port. FIG. 2 and the related text clarify why this is so. Likewise, in the case of the add/drop multiplexer, an exact predetermined wavelength is obtained from its output port, wavelength $\lambda_1$ in FIG. 3. When it is known that the information content of channel 1 is transmitted on wavelength $\lambda_1$, it is thus known that channel 1 is conducted to node 34. If the mode of transmission is e.g. SDH, the channel may contain hundreds or thousands of sub-channels.

The use of entirely optical network components causes a difficulty. Due to wavelength-sensitivity the routing of channels is difficult in the network. If, for example, it would be desirable in the add/drop multiplexer shown in FIG. 3 to separate channel 3 to conduct it further to node 34, then the necessary cross-connections must be made in the multiplexer. If the multiplexer is entirely optical, quite extensive changes must be made, the entire component must be exchanged in practice. Correspondingly, when wishing to replace the channel obtainable from a certain output port of demultiplexer 36, in other words, when wishing to route the channel to another output port, changes must be made in the demultiplexer, in the worst case it must be exchanged for another.

The objective of the present invention is to achieve such a channel routing method for use in a wavelength-sensitive optical network, wherein no changes at all need to be made in existing optical network components.

The established aim is achieved with the attributes described in the independent claims.

SUMMARY OF THE INVENTION

The invention is based on the realisation that instead of using optical or electrical cross-connectors in order to re-route a certain signal content to another destination, the transmission wavelength of the signal is changed, and the changed wavelength is used to transmit the signal content. Hereby the new signal content is transmitted in the transmission network on the same wavelength used for transmitting the old signal content. Since the components of the transmission network are wavelength-selective, no changes need be made in the components, but in accordance with the earlier routing plan they transmit the old wavelength to the same destination as before, except the signal content to be transported in the wavelength has in fact been exchanged for another. That element at the transmission end which combines different channels onto the same fibre may not be wavelength-selective.

LIST OF FIGURES

Figure 4:
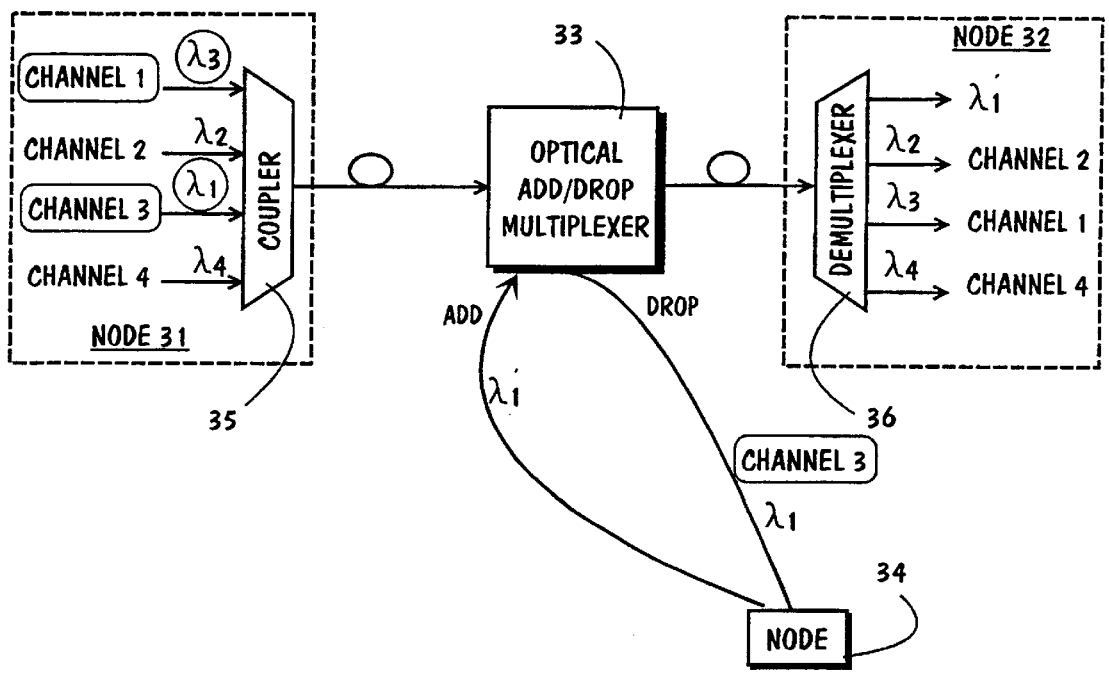
Figure 5:
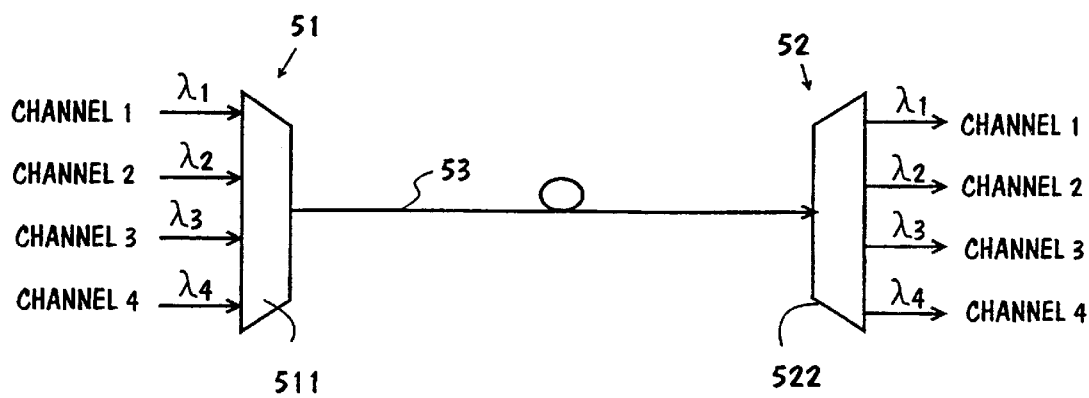
Figure 6:
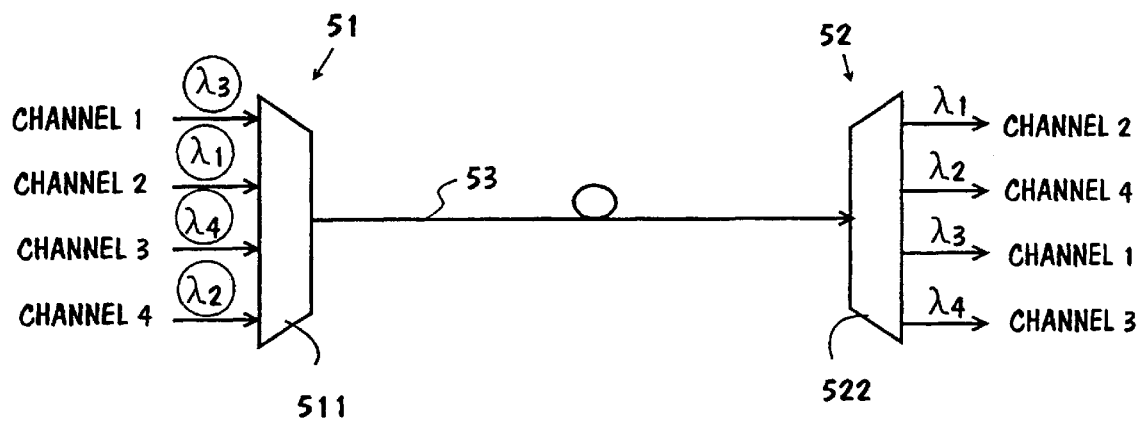

The invention will be described more closely with the aid of the appended schematic drawings, wherein FIG. 1 shows a WDM transmission system FIG. 2 depicts a wavelength multiplexer, FIG. 3 shows a part of a transmission network including an add/drop multiplexer, FIG. 4 shows a part in accordance with FIG. 3 including a function in accordance with the invention, FIG. 5 depicts a transmission network wherein no add/drop multiplexer is used, FIG. 6 illustrates the invention in the network of FIG. 5.

DETAILED DESCRIPTION OF THE INVENTION

The inventive idea can be seen clearly in FIG. 4. The figure corresponds in essential parts with FIG. 3 as regards the network components and their reference numbers. It is assumed, that compared with the situation in FIG. 3 it is desired to separate channel 3 instead of channel 1 in the add/drop multiplexer for further conducting to node 34. In this connection, channel means the information content carried by a certain wavelength.

Channel 3 uses wavelength $\lambda_3$, which should be got out from the add/drop multiplexer. Proceeding according to the state of the art, the cross-connection would be changed in add/drop multiplexer 33, either by using wavelength converters and directional couplers or the entire component would have to be replaced with another.

Since component 35 in the transmitting node is not a wavelength-selective multiplexer but a coupler insensitive to the wavelength, the procedure is such that the information content of channel 3 is transmitted not on the original wavelength $\lambda_3$ but on the wavelength $\lambda_1$ of channel 1. Correspondingly, the information content of channel 1 is transmitted on the original wavelength of channel 3.

The outcome is that the wavelength-sensitive optical transmission elements of the transmission network act exactly in the same way as before. In other words, they separate and combine the same wavelengths as before. Thus, the add/drop multiplexer separates wavelength $\lambda_1$ from the wavelengths of the optical fibre in the same manner as before. However, the information content to be transmitted by this wavelength is no longer the same content of channel 1 as earlier, but as a result of the action in accordance with the invention performed at the transmission end in node 31, the information content has been exchanged for the information content of channel 3. Thus, channel 3 is conducted to node 34.

Channels 2 and 4 arrive in node 32 as before. However, as a result of the re-routing, channel 3 no longer arrives, but channel 1 comes in its stead to be routed forward from this node along the same path as channel 3 earlier. This means that re-routing must be agreed on in advance, so that it will not cause any upsets to network users.

It is of course possible that channel 1 is no longer transmitted at all to the concerned link between nodes 31 and 32, but another link is used. Re-routing may affect the operation of several nodes in the network, which is why the routing must be planned carefully beforehand.

According to the inventive principle, it is possible in re-routing to change the wavelength of more than one channel. In the case shown as an example in FIG. 4, 24 different channel/wavelength combinations are possible. Each combination affects radically the routes of information from the transmission node forward.

FIGS. 5 and 6 illustrate this possibility.

In the initial situation of FIG. 5, channel 1 in the transmission node 51 uses wavelength $\lambda_1$, channel 2 uses wavelength $\lambda_2$, channel 3 uses wavelength $\lambda_3$ and channel 4 uses wavelength $\lambda_4$. The channels are combined onto the link by using a coupler 511 which is insensitive to the wavelength. At the other end of link 53 a wavelength-selective demultiplexer 522 separates the wavelengths, and node 52 knows that channel n is received, on a separated wavelength n. This channel can be combined to the desired output link, or it can be performed actions, e.g. a frequency conversion (not shown) before the transmission to the output link. The routing is thus predetermined.

The routing can be changed in accordance with the invention by changing the wavelength on which the information content of the channels is transmitted. In the example shown in FIG. 6, the wavelength of every channel has been changed. Thus, channel 2 is transmitted on wavelength $\lambda_1$, channel 4 is transmitted on wavelength $\lambda_2$, channel 1 is transmitted on wavelength $\lambda_3$ and channel 3 is transmitted on wavelength $\lambda_4$. The result is that at the other end of link 53 channel 2 is received from the first input of demultiplexer 522, channel 4 is received from the second input, channel 1 is received from the third input and channel 3 is received from the fourth input. The received channels are routed forward from the node along new signal paths in comparison with the case shown in FIG. 5.

A use of the method according to the invention requires that the wavelength of the transmitter can be changed in the transmitting node, in other words, the laser transmitter must be adjustable. Adjustable lasers are commercially available. One possibility is to use the manner of changing the laser transmitter's wavelength which is depicted in patent application Fl-982843 filed at the same time as the present application.

What is claimed is:

1. A method for routing an optical signal in an optical transmission system using wavelength multiplexing and including several channels, and at a transmitting node of said system:

the information content of each channel is transmitted onto its own wavelength by modulating a laser transmitter producing the wavelength in question, optical signals received from the laser transmitter are conducted to their respective inputs in a coupler, which is a non-wavelength-selective component and which combines the optical signals onto the same optical fibre as an optical sum signal, and in a receiving node:

the optical sum signal received from the optical fibre is separated into different wavelengths by using a wavelength-selective optical separation component, whereby a predetermined wavelength is obtained from each output port of said separation component, the method comprising the steps of:

changing in the transmitting node, by using at least one laser transmitter, a first wavelength to a second wavelength, both of said wavelengths being available in the optical transmission system, so that after said change the second wavelength carries the information content of the first wavelength and the first wavelength carries the information content of the second wavelength, obtaining in the receiving node the information content of the first wavelength through an output port to which the second wavelength was originally routed, and obtaining in the receiving node the information content of the second wavelength through another output port to which the first wavelength was originally routed.

2. The method as defined in claim 1, wherein when changing the first wavelength of the laser transmitter to the second wavelength, the information content of a channel related to said wavelength is transmitted from the transmitting node to another receiving node.

3. The method as defined in claim 1, wherein it is agreed in advance which laser transmitter's wavelength is changed and the optical transmission system is informed about this.

4. The method as defined in claim 1, wherein from the receiving node the information content carried by the first wavelength is routed onward in the optical transmission system along a new route, said new route being determined by the second wavelength.

\* \* \* \* \*